United States Patent
Williams et al.

(10) Patent No.: US 12,552,667 B2
(45) Date of Patent: Feb. 17, 2026

(54) INTEGRATION OF AMMONIA FUEL FOR SMR FOR HYDROGEN PRODUCTION

(71) Applicant: L'Air Liquide, Société Anonyme pour l'Etude et l'Exploitation des Procédés Georges Claude, Paris (FR)

(72) Inventors: Bryce Williams, Frankfurt am Main (DE); Teja Schmid McGuinness, Frankfurt am Main (DE)

(73) Assignee: L'Air Liquide, Societe Anonyme Pour l'Etude et l'Exploitation des Procedes Georges Claude, Paris (FR)

( * ) Notice: Subject to any disclaimer, the term of this patent is extended or adjusted under 35 U.S.C. 154(b) by 566 days.

(21) Appl. No.: 18/076,132

(22) Filed: Dec. 6, 2022

(65) Prior Publication Data

US 2024/0182300 A1 Jun. 6, 2024

(51) Int. Cl.
*C01B 3/34* (2006.01)
(52) U.S. Cl.
CPC ...... *C01B 3/346* (2013.01); *C01B 2203/0216* (2013.01); *C01B 2203/0283* (2013.01); *C01B 2203/046* (2013.01); *C01B 2203/0475* (2013.01); *C01B 2203/0833* (2013.01); *C01B 2203/0883* (2013.01); *C01B 2203/1241* (2013.01)
(58) Field of Classification Search
CPC ............ C01B 3/346; C01B 2203/0216; C01B 2203/0283; C01B 2203/046; C01B 2203/0475; C01B 2203/0833; C01B 2203/0883; C01B 2203/1241; C01B 2203/0822; C01B 2203/043; C01B 2203/0811; C01B 2203/1235; C01B 2203/1258; C01B 2203/141; C01B 2203/146; C01B 2203/148; C01B 3/48; C01B 3/506; C01B 3/56; C01B 3/38; C01B 3/36; F25J 3/0223; F25J 3/0257; F25J 3/0266; F25J 2200/02; F25J 2205/40; F25J 2205/64; F25J 2205/80; F25J 2210/04; F25J 2245/02
See application file for complete search history.

(56) References Cited

U.S. PATENT DOCUMENTS

2021/0163286 A1* 6/2021 Ostuni ................ C01B 3/025

* cited by examiner

*Primary Examiner* — Anthony J Zimmer
*Assistant Examiner* — Syed T Iqbal
(74) *Attorney, Agent, or Firm* — Justin K. Murray

(57) ABSTRACT

A method of producing hydrogen from a hydrocarbon feedstock is provided. Wherein, at least a portion of a fuel stream comprises a superheated ammonia stream. And, at least: a first portion of a hydrogen-rich stream is combined with a shifted syngas stream prior to introduction into a pressure swing adsorber, a second portion of the hydrogen-rich stream is combined with the fuel stream prior to introduction into a steam methane reformer, and/or a third portion of the hydrogen-rich stream is combined with a hydrocarbon containing feedstock stream and a steam stream prior to introduction into a feed pre-heater. Heat integration between the ammonia vaporization and superheating steps is employed to cool process streams to minimize and even eliminate a dedicated cryogenic refrigeration system.

9 Claims, 3 Drawing Sheets

INTEGRATION OF AMMONIA FUEL FOR SMR FOR HYDROGEN PRODUCTION

BACKGROUND

Conventional, state-of-the-art production of hydrogen is the steam methane reformer (SMR) which uses methane (e.g. natural gas) as both a feedstock and a fuel to provide the required energy input to produce syngas and ultimately hydrogen.

Other methods are possible, such as autothermal reforming (ATR) and partial oxidation (POX). However, these are not relevant for the present invention because the feedstock and fuel from these processes are always from the same, co-mingled source.

A variety of methods and processing schemes are available to capture the produced carbon dioxide ($CO_2$) and avoid "carbon" emissions to the atmosphere during hydrogen production in an SMR. In addition, a number of alternative fuels schemes have been proposed to reduce or eliminate carbon emissions. These will be individually addressed in the next section.

The single, most important disadvantage of hydrogen production by SMR is that the associated $CO_2$ emissions are high $CO_2$ is formed in the process: both directly in the SMR reactions and also in the following water-gas-shift reactions. $CO_2$ is also produced in the combustion of natural gas fuel, to provide heat to drive the SMR process chemistry. Typically, residual streams from various hydrogen purification processes (containing $CO_2$, CO, unreacted methane and lost hydrogen) are added to the SMR fuel stream. Collectively, these carbon emissions are then emitted to the atmosphere via the flue gas of the SMR.

Various techniques have been proposed and even implemented in the art to mitigate these emissions. While often discussed, carbon capture of $CO_2$ from flue gases of an SMR by, for example, amine wash, is expensive. This comes from the additional equipment which must be installed (capex) but also the practical operation of such equipment can be expensive (OPEX).

Another technique involves separation of the $CO_2$ produced in the process. This can also be accomplished by amine wash and can be more effective than scrubbing of flue gases because of the relatively higher pressure of the process streams.

Various other technologies are suitable for $CO_2$ capture on the process gas: other chemical solvents (ammonium carbonate—ammonium bicarbonate, potassium carbonate), physical absorption processes (e.g. Rectisol, Selexol), or adsorption processes (e.g. sorption enhanced water gas shift, VPSA $CO_2$).

Yet another technique involves cryogenic separation of $CO_2$ from process gases. This is typical after purification of hydrogen by other methods (e.g. pressure-swing adsorption or membranes). In the case of hydrogen purification by PSA, the tail-gas stream can be subjected to cryogenic separation to remove the $CO_2$. This may optionally be coupled with other separation processes, such as membranes, to further enhance the separations. The lower $CO_2$ waste gas can then be burned with lower emissions or alternatively be recycled back to the SMR process. While this provides additional improvements to the above-mentioned methods, for example higher overall hydrogen recovery, a disadvantage is the investment cost—especially related to the need for low-temperature refrigeration systems.

Another approach to reduce $CO_2$ emissions of hydrogen production in an SMR is to use alternative fuels that have a lower $CO_2$ loading. A version of this concept is to use a portion of the produced hydrogen as fuel, sometimes referred to as "hydrogen fueling". If the $CO_2$ has been captured on the process gas, combustion of part of the hydrogen production generates no direct $CO_2$ emissions and thus has been proposed by others. The main disadvantage of this approach is that the process natural gas consumption and syngas train must be oversized by about 30% beyond the desired $H_2$ production rate, in order to have the required additional hydrogen available for fuel. This causes the capex of the SMR to increase, inline with the higher hydrogen production capacity.

Use of bio-derived fuels, such as biogas, bioethanol, or recovered $CO_2$ fuels, such as synthetic natural gas, can also be considered carbon-neutral owing to the fact that the gas was produced from what was previously atmospheric $CO_2$. While the concept that such fuels are carbon-neutral is generally accepted, use of them will none-the-less re-emit $CO_2$ to the atmosphere. Other approaches could therefore have a higher impact on reducing the carbon emissions during hydrogen production. Additionally, the availability of these fuels in sufficient quantities for this purpose can be questioned.

In place of fuel, the use of green electricity for heating has been proposed to eliminate the emissions from hydrogen production. This can be accomplished by electric heating of an SMR, or indeed by direct use of the electricity in the electrolysis of water to produce hydrogen. Generally, while such applications are theoretically or even practically possible, the demonstration of these technologies at the typical industrial scale of 100,000 Nm3/h has not yet been achieved.

There is a desperate need for more cost-effective hydrogen production methods, at sufficient scale, that also minimize $CO_2$ emissions to the environment.

Summary

A method of producing hydrogen from a hydrocarbon feedstock is provided. The method includes introducing a hydrocarbon containing feedstock stream and a steam stream into a feed pre-heater, thereby producing a heated process stream. Introducing the heated process stream and a fuel stream into a steam methane reformer, thereby producing a raw syngas stream. Introducing the raw syngas stream into a water-gas shift reactor, thereby producing a shifted syngas stream. Introducing the shifted syngas stream into a pressure swing adsorption unit, thereby producing a hydrogen product stream and a PSA tail-gas stream. And introducing the PSA tail-gas stream into a hydrogen recovery unit, thereby producing a hydrogen-rich stream and a hydrogen-lean stream.

At least a portion of the fuel stream comprises a superheated ammonia stream. And, at least: a first portion of the hydrogen-rich stream is combined with the shifted syngas stream prior to introduction into the pressure swing adsorber, a second portion of the hydrogen-rich stream is combined with the fuel stream prior to introduction into the steam methane reformer, and/or a third portion of the hydrogen-rich stream is combined with the hydrocarbon containing feedstock stream and the steam stream prior to introduction into the feed pre-heater.

BRIEF DESCRIPTION OF THE FIGURES

For a further understanding of the nature and objects for the present invention, reference should be made to the following detailed description, taken in conjunction with the accompanying drawings, in which like elements are given the same or analogous reference numbers and wherein.

ELEMENT NUMBERS

Figure 1:
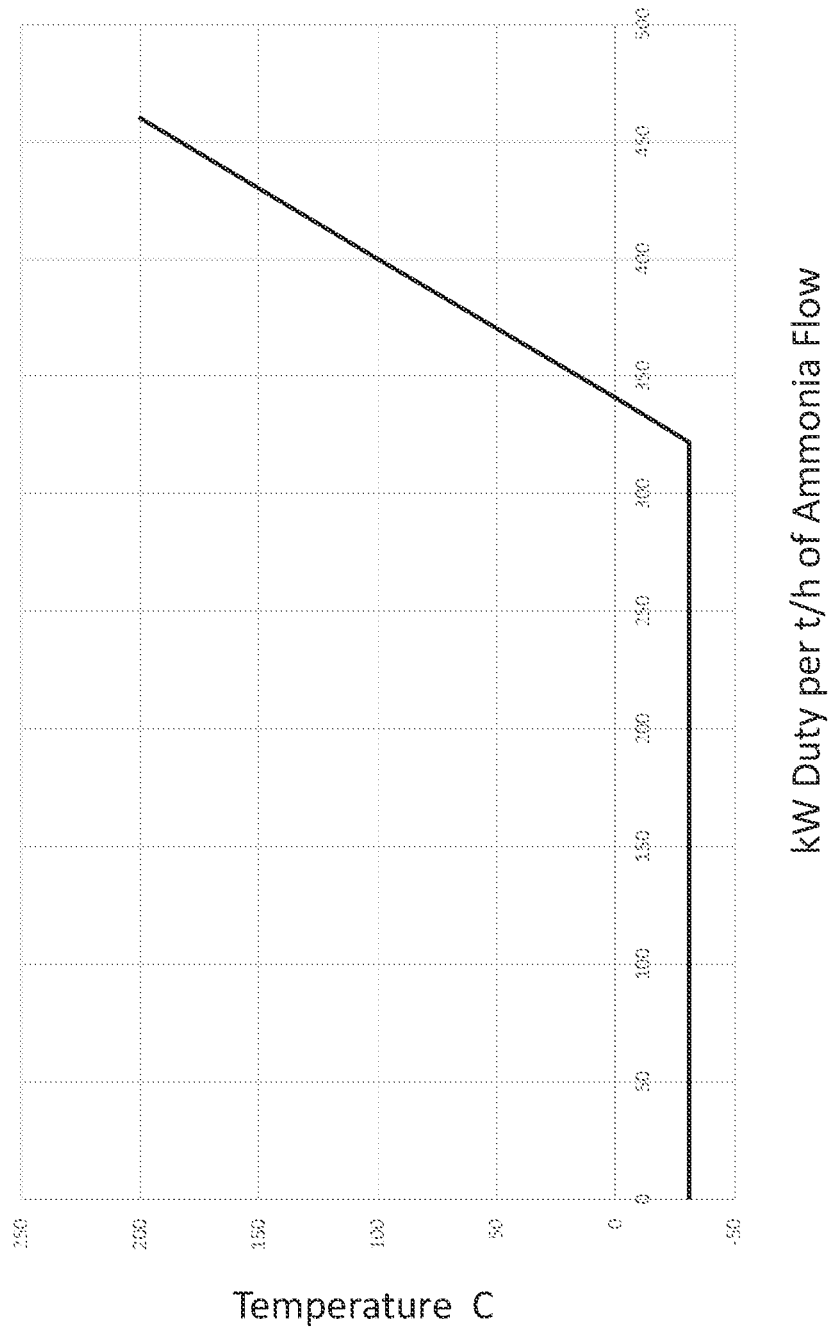
FIG. 1 is a schematic representation of a representative heating curve for ammonia vaporization, as is well known in the art.

101=hydrocarbon containing stream
102=steam stream
103=feed preheater
104=heated process stream
105=liquid ammonia stream
106=ammonia vaporizer
107=vaporized ammonia stream
108=ammonia superheater
109=superheated ammonia stream
110=steam methane reforming unit
111=raw syngas stream
112=waste heat boiler
113=cooled raw syngas stream
114=water-gas shift reactor
115=shifted syngas stream
116=syngas cooling unit
117=cooled shifted syngas stream
118=first vapor liquid separator
119=syngas condensate stream
120=syngas vapor stream
121=pressure swing adsorption unit
122=hydrogen product stream
123=PSA tail-gas stream
124=first tail-gas compressor
125=compressed tail-gas stream
126=first tail-gas cooler
127=first tail-gas condensate stream
128=cooled compressed tail-gas stream
129=tail-gas dryer
130=dried compressed tail-gas stream
131=second tail-gas compressor
132=further compressed tail-gas stream
133=cryogenic cooler
134=cold tail-gas stream
135=second vapor liquid separator
136=second tail-gas condensate stream
137=tail-gas vapor stream
138=tail-gas vapor heater
139=heated tail-gas vapor stream
140=hydrogen recovery unit
141=hydrogen rich stream
142=first portion (of hydrogen rich stream)
143=second portion (of hydrogen rich stream)
144=third portion (of hydrogen rich stream)
145=carbon dioxide rich stream
146=stripping column
147=stripped vapor stream
148=carbon dioxide rich stream
149=carbon dioxide heater
150=heated carbon dioxide stream
151=carbon dioxide compressor
152=carbon dioxide product
153=fuel stream
154=oxygen-rich stream/oxygen-enhanced air stream
155=pre-reformer (optional)

DESCRIPTION OF PREFERRED EMBODIMENTS

Illustrative embodiments of the invention are described below. While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

As used herein, the term "substantially all" is defined as meaning at least 90%, preferably at least 95%, and more preferably at least 99%.

As used herein, the term "oxygen-rich stream" is defined as a stream containing at least 90% oxygen, preferably at least 95% oxygen, more preferably at least 98% oxygen.

As used herein, the term "oxygen-enhanced air stream" is defined as a stream containing greater than 20% oxygen, preferably greater than 30% oxygen, more preferably greater than 50% oxygen.

It is known that other fuels for the SMR, such as ammonia, are possible to displace natural gas fuel. Provided that the ammonia was produced in a low-carbon manner, either by using low-carbon hydrogen, e.g. produced by electrolysis or by capturing and/or offsetting the emissions, ammonia combustion releases no direct carbon dioxide. The use of ammonia as a fuel in combustion applications, or indeed internal combustion engines, is not a new technology. However, ammonia fuel for an SMR for hydrogen production is somewhat counter-intuitive, at first glance.

Ammonia has been the single largest volume chemical produced globally and is produced from hydrogen for some time. It finds wide use in agriculture as a fertilizer, as well as in the chemical industry, and also as a refrigerant. It is stored and shipped as a liquid—either under pressure or at ambient pressure using refrigeration systems. The sudden release of pressurized, liquid ammonia to ambient pressure causes the liquid temperature to drop to about −30° C. Such a temperature level is advantageous for cryogenic processes, such as gas separation.

Blue ammonia describes ammonia where the produced carbon dioxide emissions have been reduced by more than about 60%. It can be produced from several processes, including SMR, where the produced carbon dioxide emissions have been mitigated by capture. Such ammonia can be produced from the hydrogen process of the present invention, for example, where it is combined with nitrogen. Other processes include ATR-based hydrogen with carbon dioxide capture plus nitrogen.

Green ammonia describes when the carbon dioxide emissions of the ammonia process have been completely eliminated. A prominent example of such a process is the use of renewable electricity for hydrogen production by electrolysis and nitrogen separation from air—combined in an ammonia loop.

Blue or green ammonia, collectively referred to as low-carbon ammonia, could be produced and then partly consumed on the site of the hydrogen production or it could be transported from remote production (e.g. from where renewable power is available) and then used as a fuel. In the case of transport, emissions from the transport should also be considered in the overall carbon footprint of the process.

An alternative process could use the low-carbon ammonia as a feedstock to re-produce the hydrogen. Ammonia, in this case, would be serving as a hydrogen carrier. The so-called "ammonia cracking" processes still require fuel to drive the chemical reaction. The present invention focuses on the use of natural gas as feedstock and at least part of the fuel as ammonia. However, the option of using NH3 for a portion of the feedstock is not automatically excluded.

With the lower associated carbon emissions, the use of blue or green ammonia as a fuel to fire an SMR therefore represents a corresponding reduction of carbon emissions for the SMR process.

An opportunistic integration of ammonia fuel vaporization in an SMR with carbon capture has been conceived to reduce the costs associated with building an SMR with carbon capture. In particular, there is no need for dedicated refrigeration equipment to start-up and operate the plant.

With ammonia liquid supply, the liquid flashes to vapor at the low pressures (e.g. nominally above ambient pressure) typical for combustion processes. At such pressures, the temperature level is approximately −30° C. FIG. 1 depicts a representative heating curve for ammonia vaporization. About 320 KW of low-temperature refrigeration duty is provided per tonne per hour of ammonia flow. Additional refrigeration duty of ca. 30 kW/(t/h) is provided to heat up the ammonia further to ambient temperature. Further heating of the ammonia vapor up to or beyond 200° C. can be practiced to provide preheat prior to combustion.

Figure 2:
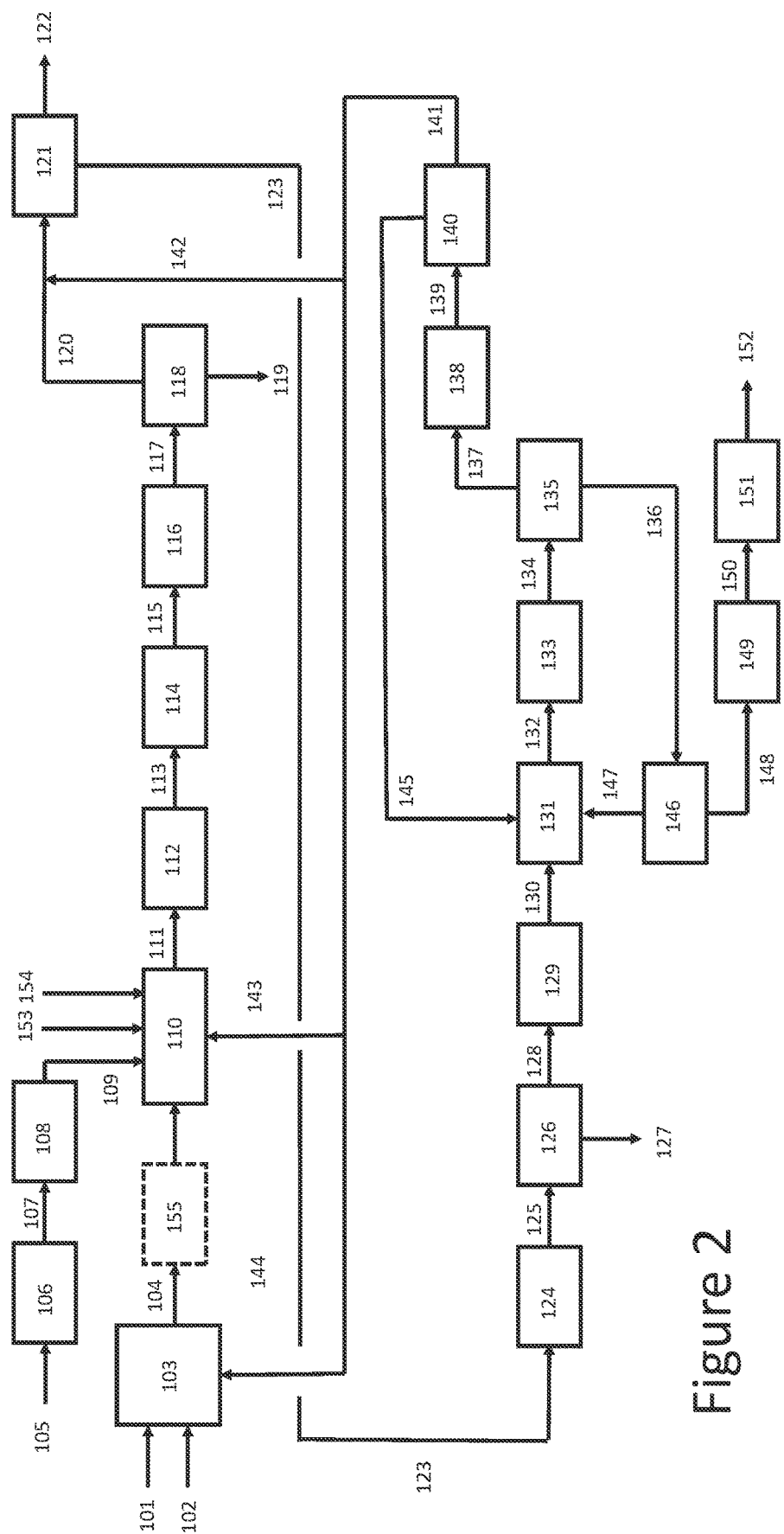
FIG. 2 is a schematic representation of the overall scheme of integration of ammonia as fuel for an SMR producing hydrogen, in accordance with one embodiment of the present invention.

A simplified schematic process flow diagram for an SMR-based hydrogen production process using ammonia fuel is shown in FIG. 2. Hydrocarbon containing stream 101 and steam stream 102 are preheated in feed preheater 103 thereby producing heated process stream 104. Preheating of the fuel and combustion oxidant (either air or oxygen) is not shown, but may be done by any means known in the art. Liquid ammonia stream 105 is introduced into ammonia vaporizer 106, thereby producing vaporized ammonia stream 107. Vaporized ammonia stream 107 is introduced into ammonia superheater 108, thereby producing superheated ammonia stream 109. Heated process stream 104, as well as superheated ammonia stream 109, fuel stream 153, and optionally a second portion 143 of hydrogen rich stream 141 (below) are introduced into steam methane reforming unit 110 (SMR) as fuel streams, thereby producing raw syngas stream 111.

In one embodiment, superheated ammonia stream 109 and second portion 143 of hydrogen rich stream 141 constitutes substantially all of the fuel admitted into steam methane reforming unit 110. In one embodiment, an oxygen-rich stream or an oxygen-enhanced air stream is provided to steam methane reforming unit 110. In one embodiment, if hydrocarbon containing stream 101 contains a sufficient amount of hydrocarbons heavier than methane, pre-reformer 155 maybe added. In this embodiment, heated process stream 104 enters pre-reformer 155, and the pre-reformed stream then enters steam methane reforming unit 110. Other heat integrations between the process and SMR flue gas (not shown) are known in the art to optimize preheating and efficiency of the overall plant.

It is well known in the art that a steam methane reforming unit 110 has a process side, or a tube-side, which is inside of the heated tubes and that this is the path that the process feed (i.e. heated process stream 104) takes to encounter catalyst and form raw syngas stream 111. And on the shell side, or fired side, of the tubes are a series of burners wherein the various fuel stream (i.e. superheated ammonia stream 109, second portion 143 of hydrogen rich stream 141, fuel stream 153, and oxygen-enriched oxidant stream 154) are combusted, thereby providing the heat required by the process side. As this is well known and understood by one skilled in the art, these details are not included in the figures.

Raw syngas stream 111 is then introduced into waste heat boiler 112 (WHB), thereby producing cooled raw syngas stream 113. Cooled raw syngas stream 113 is then introduced into water-gas shift reactor 114, thereby producing shifted syngas stream 115. Shifted syngas stream 115 is then introduced into syngas cooling unit 116, thereby producing cooled shifted syngas stream 117. Cooled shifted syngas stream 117 is then introduced into first liquid-vapor separator 118, thereby producing syngas condensate stream 119 and syngas vapor stream 120.

Syngas vapor stream 120 may be combined with a first portion 142 of hydrogen rich stream 141 (below), and the combined stream is introduced into pressure swing adsorption unit 121, thereby producing hydrogen product stream 122 and PSA tail-gas stream 123. PSA tail-gas stream 123 is then compressed in first tail-gas compressor 124, thereby producing compressed tail-gas stream 125. Compressed tail-gas stream 125 is then cooled in first tail-gas cooler 126, thereby producing first tail-gas condensate stream 127 and cooled compressed tail-gas stream 128. Cooled compressed tail-gas stream 128 is then introduced into tall-gas dryer 128, thereby producing dried compressed tail-gas stream 130. Dried compressed tail-gas stream 130, along with carbon dioxide rich stream 145 (below) and/or stripped vapor stream 147, are introduced into second tail-gas compressor 131, thereby producing an intermediate stream 132 for carbon dioxide and hydrogen recovery.

The intermediate stream 132 then enters cryogenic cooler 133, thereby producing a cold vapor/liquid intermediate stream 134. Cold vapor/liquid intermediate stream 134 then enters second vapor-liquid separator 135, thereby producing an intermediate condensate stream 136 and intermediate vapor stream 137. Intermediate vapor stream 137 enters heater 138, thereby producing heated intermediate vapor stream 139. Heated intermediate vapor stream 139 enters hydrogen recovery unit 140, thereby producing hydrogen rich stream 141 and carbon dioxide rich stream 145.

Hydrogen recovery unit 140 may be one or more membranes. Hydrogen rich product stream 141 may be recycled to one of three places. First portion 142 may be combined with syngas vapor stream 120 prior to admission into pressure swing adsorption unit 121, as described above. Second portion 143 may be introduced into steam methane reforming unit 110 as fuel, as described above. Third portion 144 may be combined with hydrocarbon containing stream 101 and steam stream 203 and used as feed to steam methane reforming unit 110, as described above. PSA allows direct recovery of additional hydrogen product. Recycle to the SMR feed allows conversion of methane to additional hydrogen. While these recycle locations are highly preferred, exclusive use of only these two would accumulate inerts in the plant, such as nitrogen. Thus, a portion of the hydrogen-rich product from the H2 Recovery step must be sent to the SMR fuel.

The intermediate condensate stream 136 enters stripping column 146, thereby producing stripped vapor stream 147 and carbon dioxide rich liquid stream 148. The intermediate condensate stream is stripped of light gases (e.g. hydrogen, nitrogen, carbon monoxide, and methane) to reach product-quality carbon dioxide. Carbon dioxide rich liquid stream 148 then optionally enters carbon dioxide heater 149. thereby producing heated carbon dioxide stream 150. Heated carbon dioxide stream 150 is then introduced into carbon dioxide compressor 151 thereby producing product carbon dioxide vapor product. The product carbon dioxide can be injected into long-term storage or used industrially for other purposes. Alternatively, the carbon dioxide rich liquid stream could be exported directly as a product liquid.

Figure 3:
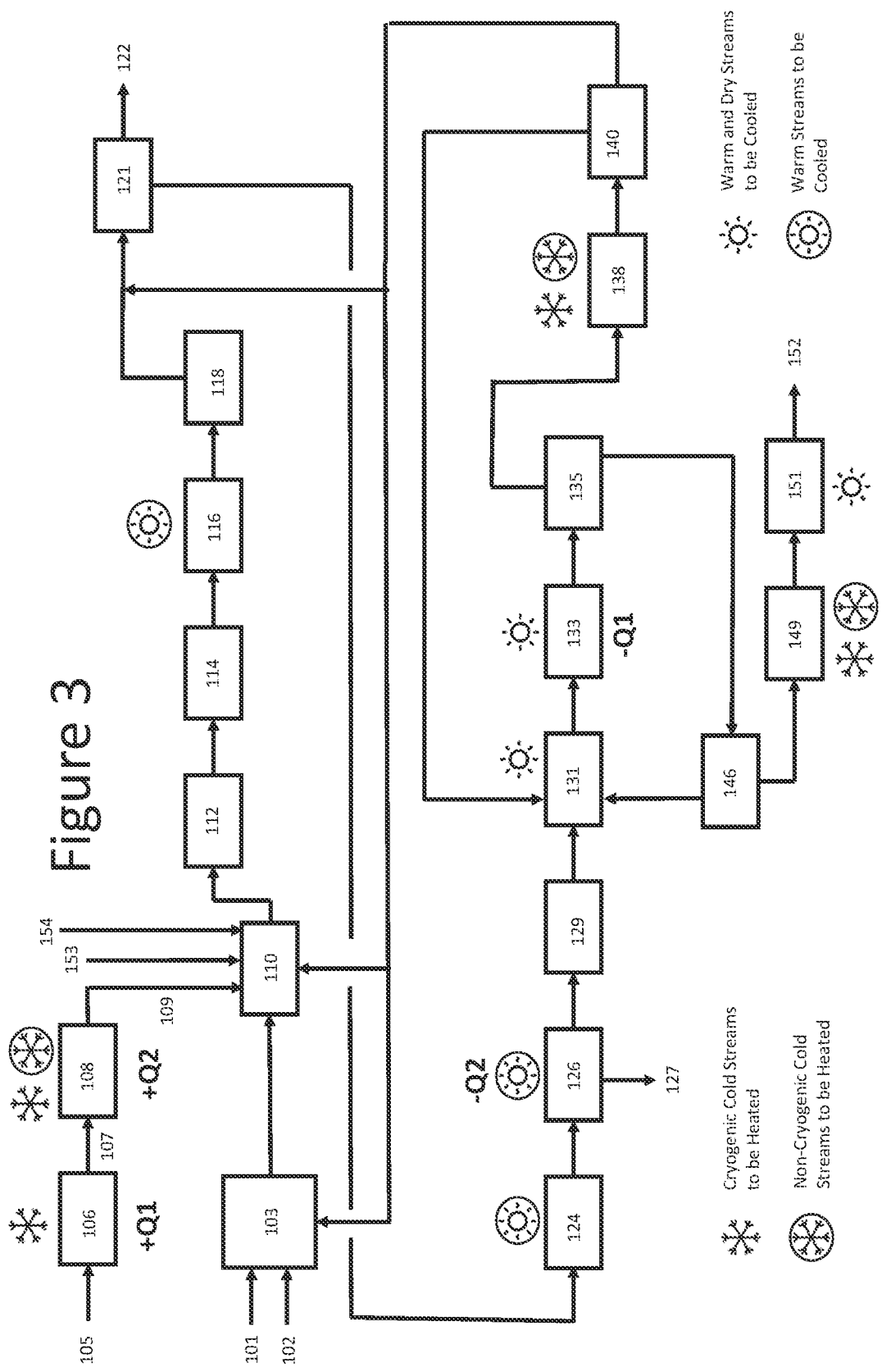
FIG. 3 is a schematic representation indicting internal heat integration, in accordance with one embodiment of the present invention.

Turning to FIG. 3, one possible example of heat integration within this process is described. Cryogenic streams (significantly below ambient temperature) that need to be warmed can provide sources of refrigeration. Compatible warm (or hot) process streams that require cooling utilize the same heat integration streams as described above. The following table summarizes these streams.

| | |
|---|---|
| ❋ | Cryogenic streams that are at or below −30 C. and need to be heated. |
| ❋ | Cold streams that are between −30 C. and ambient temperature and need to be heated. |
| ❋ | Warm streams that need to be cooled, by streams that are warmer than 0 C. |
| ☼ | Warm and dry streams that need to be cooled and can be cooled by streams that are below 0 C. |

A temperature of about −30 C is typically the lowest observed and practical temperature from ammonia vaporization. Thus, any compatible cryogenic stream that needs to be warmed, may be between about −30 C and about 0 C. Similarly, if a warm stream contains water, the minimum practical cooling temperature would be about −5 C. Warm streams that contain any appreciable amount of moisture ("wet streams") may only be cooled by cold sources above about −5 C to a temperature of about 0 C. Once this stream is dried, it can then be further cooled cryogenically to well below −5 C. The difference between −5 C and 0 C would pertain to the physical limitation of the delta T across the associated heat exchanger.

In one non-limiting example, liquid ammonia stream 105 is vaporized in ammonia vaporizer 106 by indirect heat exchange, thereby producing vaporized ammonia stream 107. This act of vaporization requires a first heat input (heating duty) +Q1. Simultaneously, the intermediate stream 133 is cryogenically cooled in cryogenic cooler 133, thereby producing cold vapor/liquid intermediate stream 134. This act of cooling requires a first heat removal (cooling duty) −Q1. In this example, at least a portion of first cooling duty −Q1 is provided by first heating duty +Q1.

In another non-limiting example, liquid ammonia stream 105 is vaporized in ammonia vaporizer 106, and then superheated in ammonia superheater 108 by indirect heat exchange, thereby producing superheated ammonia stream 109. This act of superheating requires a second heat input (heating duty) +Q2. Simultaneously, PSA tail-gas stream 123 is compressed and cooled in first tail-gas cooler 126, thereby producing cooled compressed tail-gas stream 128. This act of cooling requires a second heat removal (cooling duty) −Q2. In this example, at least a portion of second cooling duty −Q2 is provided by second heating duty +Q2.

In a conventional SMR that does not use ammonia fuel (not shown), the cryo-cooling step requires the inclusion of a dedicated refrigeration system to achieve cold temperatures during start-up and upset conditions. Additionally, the equivalent of first tail-gas cooler 126 requires chilled water cooling for efficient operation of the equivalent to tail-gas dryer 129. During normal operation of such a plant, the refrigeration system provides relatively little or even no cooling duty because of efficient heat integration. Thus, the initial capital investment (CAPEX) of such a system includes the refrigeration system, even though it may not necessarily be used during normal operation. The inventive process lowers the initial investment cost because refrigeration duty provided by the ammonia fuel vaporization can be used to reach cryogenic temperatures during start-up and upset conditions. In the present inventive system, there is no independent, dedicated system to provide additional refrigeration. All the required refrigeration is provided by internal sources.

In normal operation, depending on the proportion of ammonia fuel used in the steam methane reformer, the quantity of refrigeration available from ammonia may well be in excess of that required for operation of the cryo-cooling step. Thus, additional refrigeration would be available for other uses, such as interstage cooling of the compressors (e.g. second tail-gas compressor 131 and optional carbon dioxide compressor 151).

Once the range of extreme cryogenic temperatures has been overcome (e.g. above about −5° C.), further heat integration of the cold ammonia vapor can be used to provide cooling at the indicated locations of syngas cooling unit 116, first tail-gas compressor 124, and first tail-gas cooler 126 without the risk of ice formation on the process side. Particularly first tail-gas cooler 126 is advantageous as the process temperature should be reduced to about 10° C. These process streams need to be cooled but still contain water near the saturation level. Use of −30° C. refrigeration would likely form ice. Thus, the further heating of the ammonia vapor above about 0° C. provides an opportunistic heat integration for these locations, as well. Any heat integration of this type serves to reduce cooling water usage or electricity consumption from air-cooled heat exchangers which would otherwise be used in this service.

An additional use for any higher temperature (e.g. non-cryogenic) heat duty would be to further cool the flue gases of the SMR to recover water. This is not shown in FIG. 2 or FIG. 3 but would be possible because the clean fuel would have been desulphurized. In the extreme case of pure NH3 combustion, water recovery from flue gases could be achieved and used as make-up water for the steam or cooling systems.

Other normal heat integrations are not shown, or described, but are understood to be part of the invention. The most prominent examples are waste heat recovery from the SMR flue gases, as well as pre-heating of the combustion air (or oxygen).

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A method of producing hydrogen from a hydrocarbon feedstock, comprising:
   introducing a hydrocarbon containing feedstock stream and a steam stream into a feed pre-heater, thereby producing a heated process stream,
   introducing the heated process stream to a tube side and a fuel stream into a fired side of a steam methane reformer thereby producing a raw syngas stream,
   introducing the raw syngas stream into a water-gas shift reactor, thereby producing a shifted syngas stream,
   introducing the shifted syngas stream into a pressure swing adsorption unit, thereby producing a hydrogen product stream and a PSA tail-gas stream,
   introducing the PSA tail-gas stream into a hydrogen recovery unit, thereby producing a hydrogen-rich stream and a hydrogen-lean stream,
   wherein, at least a portion of the fuel stream comprises a superheated ammonia stream,
   wherein, at least:
      a first portion of the hydrogen-rich stream is combined with the shifted syngas stream prior to introduction into the pressure swing adsorber,
      a second portion of the hydrogen-rich stream is combined with the fuel stream prior to introduction into the steam methane reformer, and/or
      a third portion of the hydrogen-rich stream is combined with the hydrocarbon containing feedstock stream and the steam stream prior to introduction into the feed pre-heater.

2. The method of claim 1, wherein a liquid ammonia stream is vaporized and superheated thereby producing the superheated ammonia stream.

3. The method of claim 1, wherein the hydrogen-lean stream is cryogenically separated into a carbon dioxide product stream.

4. The method of claim 1,
   wherein a liquid ammonia stream is vaporized by indirect heat exchange thereby requiring a first heating duty thereby producing a vaporized ammonia stream, which is then superheated thereby producing the superheated ammonia stream,
   wherein the hydrogen-lean stream and PSA tail-gas stream are combined and cryogenically cooled by indirect heat exchange thereby requiring a first cooling duty,
   wherein at least a portion of the first cooling duty is provided by the first heating duty.

5. The method of claim 1,
   wherein a liquid ammonia stream is vaporized, thereby producing a vaporized ammonia stream, which is then superheated by indirect heat exchange thereby requiring a second heating duty, thereby producing the superheated ammonia stream,
   wherein the PSA tail-gas stream is compressed and then cooled by indirect heat exchange thereby requiring a second cooling duty,
   wherein at least a portion of the second cooling duty is provided by the second heating duty.

6. The method of claim 1, wherein substantially all of the fuel stream comprises the superheated ammonia stream and the second portion of the hydrogen-rich stream.

7. The method of claim 1, wherein there is no independent, dedicated system to provide additional refrigeration.

8. The method of claim 1, further comprising introducing an oxygen-enriched oxidant stream into the steam methane reformer.

9. The method of claim 1, further comprising introducing the heated process stream into a pre-reforming unit prior to being introduced into the steam methane reformer.

* * * * *